United States Patent
Kuperman et al.

(10) Patent No.: US 10,819,723 B2
(45) Date of Patent: Oct. 27, 2020

(54) SECURING PORT FORWARDING THROUGH A NETWORK TRAFFIC HUB

(71) Applicant: Cujo LLC, El Segundo, CA (US)

(72) Inventors: Leonid Kuperman, Los Angeles, CA (US); Einaras von Gravrock, Redondo Beach, CA (US)

(73) Assignee: Cujo LLC, El Segundo, CA (US)

(*) Notice: Subject to any disclaimer, the term of this patent is extended or adjusted under 35 U.S.C. 154(b) by 311 days.

(21) Appl. No.: 15/936,317

(22) Filed: Mar. 26, 2018

(65) Prior Publication Data
US 2018/0278637 A1    Sep. 27, 2018

Related U.S. Application Data

(60) Provisional application No. 62/477,359, filed on Mar. 27, 2017.

(51) Int. Cl.
*H04L 29/06* (2006.01)
*H04L 12/28* (2006.01)
*H04L 29/12* (2006.01)

(52) U.S. Cl.
CPC ...... *H04L 63/1425* (2013.01); *H04L 12/2803* (2013.01); *H04L 12/2807* (2013.01);
(Continued)

(58) Field of Classification Search
CPC ............. H04L 63/1425; H04L 63/0884; H04L 12/2803; H04L 63/102; H04L 12/2807; H04L 63/20; H04L 61/103; H04L 61/6022; H04L 61/2015; H04L 63/0281; H04L 63/0227

See application file for complete search history.

(56) References Cited

U.S. PATENT DOCUMENTS

| 8,490,190 B1* | 7/2013 | Hernacki | H04L 63/1425 726/23 |
| 8,959,643 B1* | 2/2015 | Invernizzi | H04L 63/1425 713/187 |

(Continued)

OTHER PUBLICATIONS

PCT International Search Report and Written Opinion, PCT Application No. PCT/US18/24381, dated Jun. 6, 2018, 13 pages.

(Continued)

*Primary Examiner* — John B King
(74) *Attorney, Agent, or Firm* — Withrow & Terranova, PLLC

(57) ABSTRACT

A network traffic hub is configured to receive a request for a port service (i.e., port forwarding or port triggering) from a smart appliance in a local network. The request may be a part of the UPnP protocol, which includes SSDP and IGDP. The request may be transmitted to the network traffic hub directly or the network traffic hub may intercept the request transmitted to a router of the local network. By receiving the request, the network traffic hub prevents automatic establishment of the port service between the smart appliance and the router until an approval or denial of the port service is received from a user. As such, the user is informed of the request and has the ability to approve or deny the port service. Furthermore, the network traffic hub can configure a network to perform a port service if the network does not allow for it natively.

14 Claims, 10 Drawing Sheets

(52) U.S. Cl.
CPC ........ *H04L 63/0884* (2013.01); *H04L 63/102* (2013.01); *H04L 63/20* (2013.01); *H04L 61/103* (2013.01); *H04L 61/2015* (2013.01); *H04L 61/6022* (2013.01)

(56) References Cited

U.S. PATENT DOCUMENTS

| | | | |
|---|---|---|---|
| 2001/0014097 A1* | 8/2001 | Beck | H04L 67/14 370/401 |
| 2003/0101358 A1* | 5/2003 | Porras | G06F 21/55 726/4 |
| 2003/0115446 A1* | 6/2003 | Simon | G06F 21/604 713/100 |
| 2005/0050338 A1* | 3/2005 | Liang | H04L 63/0218 713/188 |
| 2006/0048224 A1* | 3/2006 | Duncan | G06F 21/6218 726/22 |
| 2008/0049622 A1* | 2/2008 | Previdi | H04L 45/22 370/237 |
| 2009/0260083 A1* | 10/2009 | Szeto | H04L 63/1441 726/22 |
| 2011/0013591 A1* | 1/2011 | Kakumaru | H04L 61/103 370/331 |
| 2012/0182939 A1* | 7/2012 | Rajan | G06F 19/3418 370/328 |
| 2014/0143827 A1* | 5/2014 | Edery | G06F 21/51 726/1 |
| 2014/0189861 A1* | 7/2014 | Gupta | H04L 67/30 726/22 |
| 2016/0295364 A1* | 10/2016 | Zakaria | H04L 67/12 |
| 2016/0315909 A1* | 10/2016 | von Gravrock | H04L 63/1425 |
| 2016/0315955 A1* | 10/2016 | Beatty | H04L 67/12 |
| 2016/0366160 A1 | 12/2016 | Kapoor et al. | |
| 2016/0373372 A1 | 12/2016 | Gillon et al. | |
| 2017/0055148 A1* | 2/2017 | Zimmerman | H04L 63/0457 |
| 2018/0124095 A1* | 5/2018 | Hamdi | G06F 12/0868 |
| 2018/0144139 A1* | 5/2018 | Cheng | G06F 21/577 |
| 2020/0026732 A1* | 1/2020 | Bequet | G06N 3/084 |
| 2020/0059526 A1* | 2/2020 | Goeringer | H04W 88/16 |
| 2020/0092254 A1* | 3/2020 | Goeringer | H04L 63/20 |
| 2020/0104484 A1* | 4/2020 | Samuel | H04W 4/70 |

OTHER PUBLICATIONS

International Preliminary Report on Patentability for International Patent Application No. PCT/US2018/24381, dated Oct. 10, 2019, 6 pages.

* cited by examiner

SECURING PORT FORWARDING THROUGH A NETWORK TRAFFIC HUB

CROSS REFERENCE TO RELATED APPLICATION

This application claims the benefit of, and priority to, the U.S. Provisional Application No. 62/477,359, entitled "Securing Universal Plug and Play Through a Network Traffic Hub" and filed on Mar. 27, 2017, the content of which is incorporated by reference in its entirety herein.

The present disclosure relates to U.S. patent application Ser. No. 15/099,526 ("App. '526"), entitled "Network Security Analysis for Smart Appliances" and filed on Apr. 14, 2016, the content of which is incorporated by reference.

TECHNICAL FIELD

This application relates generally to network security, and specifically to secure port services over a network.

BACKGROUND

Devices such as "smart" appliances (also referred to as "internet of things" (IoT) appliances) are simplified computing devices that can connect to a network to communicate with other devices while performing a specific role (e.g., within a home or small office). Smart appliances have some specified basic computing processing intelligence but otherwise lack the capability of a full-fledged computing system such as a personal computer, smartphone, or tablet. Examples of smart appliances include televisions, refrigerators, dishwashers, washers, dryers, thermostats, digital video recorders, DVD players, and printers. By adding a certain level of intelligence to these devices, smart appliances can be made more effective or more convenient for the user. For example, a smart dishwasher might be able to communicate with a smartphone in the local network so the user can start the dishwasher via the smartphone from anywhere in a house.

Some smart appliances can communicate with devices outside of a local network. A smart appliance may receive software updates from a remote server to perform more effectively or it might receive information that it uses to perform more effectively. For example, a smart thermostat might receive information about the weather from an internet based weather service and use that information to adjust the heat settings of a house. The smart appliance might communicate with a specific server designated by the manufacturer, or it might communicate with third-party web servers via the internet.

However, many smart appliances have vulnerabilities at the operating system and network layers. Thus, smart appliances are vulnerable to security breaches that could embed code on a smart appliance and cause it to perform malicious behavior. For example, smart appliances infected with malicious code might be used to perform a Distributed Denial of Service (DDoS) attack on a remote web server or they could be used to send user information to unauthorized recipients. Due to limited access that users have to the functionality of smart appliances, it could be very difficult for a user to determine, on their own, whether a smart appliance is performing malicious behavior. Traditional approaches to protect networked devices from malicious code include anti-virus software installed on computers that monitors processes on the computer to determine if those processes might be exhibiting malicious behavior. Anti-virus software is typically installed on full-fledged computing systems such as personal computers, smartphones, and tablets. However, smart appliances do not have the computing intelligence or resources to support anti-virus software and often do not allow users to install additional software onto the smart appliance. Therefore, anti-virus software is ill-suited to protect smart appliances from being infected with malicious code.

BRIEF DESCRIPTION OF THE DRAWINGS

Figure (FIG. 1 illustrates an example system environment for a network traffic hub, in accordance with some embodiments.

DETAILED DESCRIPTION

Figure 1:
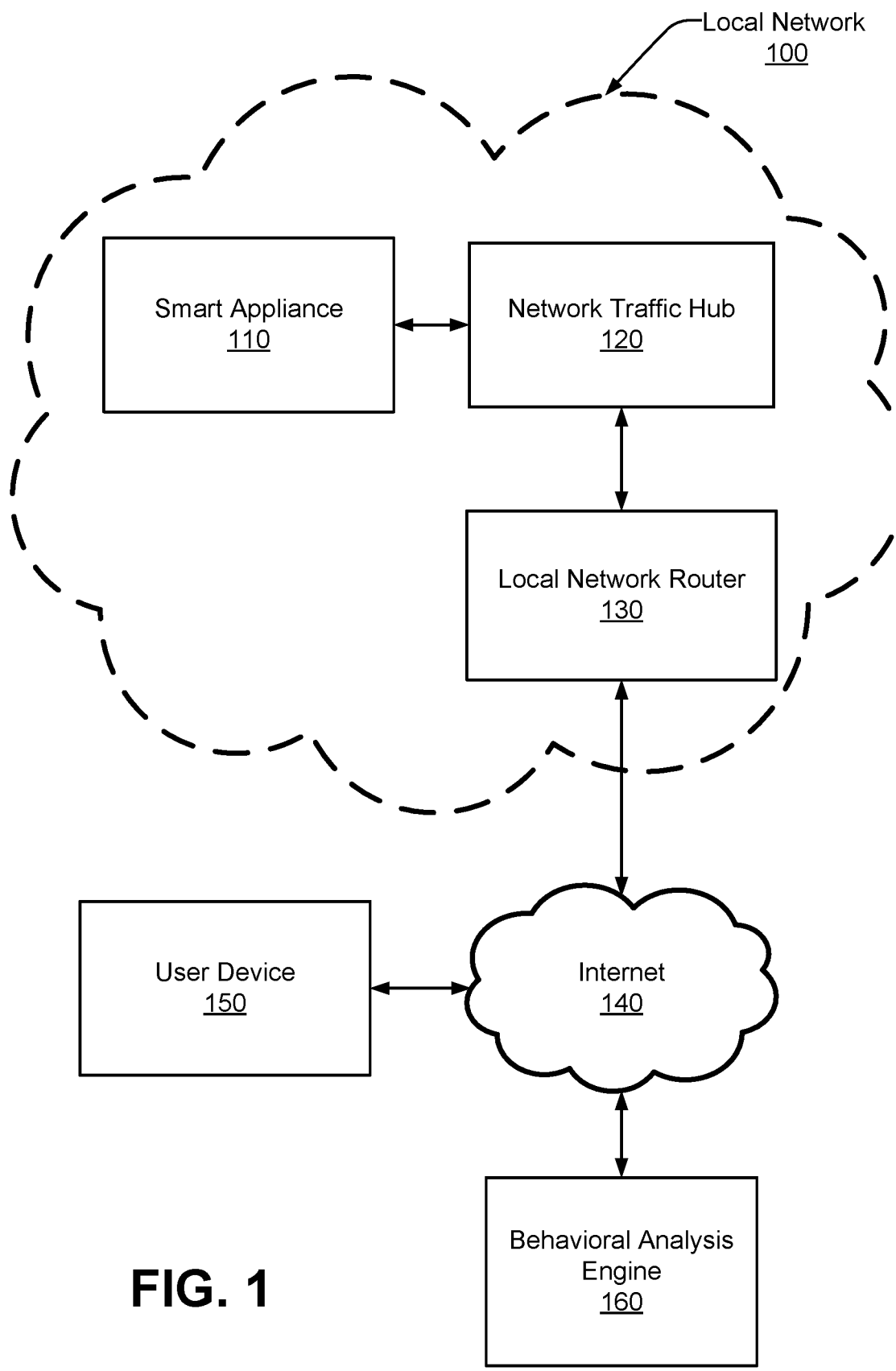

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

To allow smart appliances to communicate with and access devices outside of the local network, smart appliances typically need to enable port forwarding or port triggering. In computer networking, port forwarding or port mapping is an application of network address translation (NAT) that redirects a communication request from one address and port number combination to another while the packets are traversing a network gateway, such as a router or firewall. This technique is most commonly used to make services on a device residing inside a local network available to devices outside of the local network, by remapping the destination internet protocol (IP) address and port number of the communication to an internal device. The port number can be referred to as an "open" or "exposed" port. In this way, a device may be accessed by way of public IP address through port forwarding. Port triggering is a similar mechanism to port forwarding, except port triggering allows the port to be opened on demand by the device within the local network. As such, the port is not continually open but only when required by the device within the local network. It is noted that port services refers to port forwarding services (or port forwarding) and port triggering services (or port triggering).

Port services may be enabled through Universal Plug and Play (UPnP). UPnP is a set of protocols for network routing environments that allows individual network devices to "plug" into a network and expose ports to the Internet or wide area networks (WAN). UPnP can be used by smart appliances to automatically enable router port forwarding or port triggering. UPnP is a combination of lower level protocols, such as Simple Service Discovery Protocol (SSDP) and Internet Gateway Device Protocol (IGDP). SSDP allows for the discovery of network device capabilities and IGDP allows for automatic configuration of port mapping and port services between a network device and an upstream router on the network. In the description provided herein, the term UPnP can describe any combination of protocols and sub-protocols that allow for the automatic enablement and establishment of port services.

While UPnP is enabled by default on many routers, UPnP is a significant security vulnerability for a local network, as users of the local network typically have no indication that a network device is requesting port services from the router. This leaves devices connected to the local network open and exposed on the Internet to unwanted scanners and malicious users.

Embodiments relate to a network traffic hub that is configured to receive or intercept a request for a port service (i.e., port forwarding or port triggering) from a smart appliance in a local network. The request may be a part of the UPnP protocol. The request may be transmitted to the network traffic hub directly or the network traffic hub may intercept the request transmitted to a router of the local network. By receiving or intercepting the request for a port service, the network traffic hub prevents automatic establishment of the port service between the smart appliance and the router until an approval or denial of the port service is received from a user. The network traffic hub sends an authorization request to a user device operated by a user of the local network. As such, the user of the local network is informed of the request for a port service from the smart device and has the ability to approve or deny the port service. In some embodiments, the smart appliance's level of vulnerability to malicious software is analyzed (e.g., by a behavior analysis engine) prior to the user receiving the authorization request.

If the user approves the authorization request, the network traffic hub can allow the smart appliance to establish an open port with the router. In alternative embodiments, in response to an approval, the network traffic hub establishes an open port with the router. As a result, any traffic directed to the smart appliance through the open port will be directed to the network traffic hub and then forwarded to the smart appliance by the network traffic hub. In both embodiments, the network traffic hub can process the traffic directed to and from the smart appliance through the open port.

Although the disclosure herein relates to port services between a smart appliance and a router in a local network, this is for exemplary purposes. The principles described herein can be applied more broadly to any network device requesting a port service with a router or the network traffic hub. For example, the network traffic hub can be used to receive or intercept a request for a port service from personal computers, laptops, mobile phones, and tablets.

System Environment and Architecture

FIG. 1 illustrates an example system environment for a network traffic hub 120, in accordance with some embodiments. The system environment illustrated in FIG. 1 includes a local network 100 that includes a smart appliance 110, a network traffic hub 120, a local router 130, the Internet 140, a user device 150, and a behavioral analysis engine 160. Alternative embodiments my include more, fewer, or different components from those illustrated in FIG. 1, and the functionality of each component may be divided between the components differently from the description below. Additionally, each component may perform their respective functionalities in response to a request from a human, or automatically without human intervention.

Smart appliances 110 may be electronic, network devices with a limited level of intelligence and processing capabilities. For example, they often lack complex processors and large memory sizes, for example, due to their designed limited functionality and product cost considerations. More particularly, smart appliances 110 are capable of performing moderate amounts of computation that is specific, but limited in scope. To that extent smart appliances 110 are not full-fledged highly computational computing systems capable of complex processing, such as personal computers, smartphones, or tablets. Instead, each smart appliance 110 performs some specific role and the limited intelligence is focused on having the smart appliance 110 perform that specific role effectively. Accordingly, a smart appliance 110 does not have extensive computing resources, e.g., a powerful processor or large quantity of memory. Moreover, keeping computing resources minimal helps keep costs down for the appliances, many of which are staples, for example, in homes or small offices. Examples of appliances that can be smart appliances 110 are refrigerators, freezers, dishwashers, washers, dryers, thermostats, digital video recorders (DVRs), DVD players, and printers. A smart appliance 110 typically includes a controller or low power processor (generally, processor), a limited amount of memory, and a network interface, which is used to communicate with other network devices.

The smart appliances 110 can use the local network 100 to communicate with other devices. For example, a smart dishwasher can be configured to transmit an alert to a computer or a smartphone on the local network 100 that its cleaning cycle is completed. As another example, a smart light switch can be configured to communicate with a motion sensor via the local network 100 to determine if a person is in a room and whether to power the lights in that room. The smart appliances 110 can also communicate with devices outside of the local network 100 via the internet 140, for example through UPnP port forwarding, or port triggering. A smart appliance 100 can, for example, be configured to receive software updates from remote servers to improve or update its current control functions. Additionally, a smart appliance might receive data from a remote server via the internet 140 that it uses to make decisions (e.g., a smart thermostat might receive weather data to determine heating and cooling settings for a building). In some embodiments, a smart appliance 110 can be configured to receive instructions from a remote server via the internet 140. For example, a smart clock can be configured to receive an instruction from a known server to change the time it displays when daylight savings starts or ends.

The network traffic hub 120 collects information about the local network 100, including data about the network traffic through local network 100 and data identifying the smart appliances 110 in the local network 100. The network traffic hub 120 is also capable of receiving traffic control instructions from the behavior analysis engine 160 and processing network traffic through the local network 100 based on the traffic control instructions. Processing the network traffic through the local network 100 can include restricting where network traffic can travel, blocking network traffic from entering the local network 100, redirecting a copy of network traffic packets or features of those packets to the behavioral analysis engine 160 for analysis for malicious behavior, or quarantining the network traffic to be reviewed by a user (e.g., via the user device 150) or network administrator. In some embodiments, the functionality of the network traffic hub 120 is performed by a device that is a part of the local network 100, while in other embodiments, the functionality of the network traffic hub 120 is performed by a device outside of the local network 100. In some embodiments, the network traffic hub 120 acts as the dynamic host configuration protocol (DHCP) server by leasing internet protocol (IP) addresses and creating subnets in the local network 100. In some embodiments, the network traffic hub 120 receives or intercepts UPnP requests for port services and sends an authorization request to the behavioral analysis engine 160 or the user client device 150. In some embodiments, the network traffic hub 120 can forward traffic from the local network router 130 to the smart appliance 110. This functionality is further described below.

The network traffic hub 120 may be configured to monitor traffic that travels through the local network 100. In some embodiments, the network traffic hub 120 can be a device that is a part of the local network 100. The network traffic hub 120 can be connected to the local network 100 using a wired connection (e.g. via an Ethernet cable connected to a router) or using a wireless connection (e.g. via a Wi-Fi connection). In some embodiments, the network traffic hub 120 can comprise multiple devices in the local network 100 that, in conjunction, monitor all traffic that flows through the local network 100. In some embodiments, the network traffic hub 120 performs the functions of the local network router 130 for the local network 100.

In some embodiments, the network traffic hub 120 performs the function of the local network router 130. In some embodiments, the network traffic hub 120 intercepts traffic in the local network 100 by signaling the smart appliances 110 that the network traffic hub 120 is a router 130. In some embodiments, the network traffic hub 120 replaces the default gateway of the local network 100 with its own internet address. For example, the network traffic hub 120 may replace the default gateway of the local network 100 using an address resolution protocol (ARP) or dynamic host configuration protocol (DHCP) man-in-the-middle attack. To perform the man-in-the-middle attack, the network traffic hub 105 may use address resolution protocol (ARP) spoofing/cache poisoning to replace the default gateway. An address resolution protocol (ARP) announcement is sent to signal the smart appliances 100 to transmit network traffic to the network traffic hub 105. In some embodiments, the network traffic hub 105 uses an internet control message protocol (ICMP) attack to replace the default gateway. The network traffic hub 105 also may use a DHCP attack or port stealing to replace the default gateway.

In some embodiments, the local network 100 can be structured such that all network traffic passes through the network traffic hub 120, allowing the network traffic hub 120 to physically intercept the network traffic. For example, the network traffic hub 120 may serve as a bridge through which all network traffic must travel to reach the router 130 of the local network 100.

The behavior analysis engine 160 is configured to receive appliance traffic data and appliance identification data from the network traffic hub 120. The behavior analysis engine 160 uses that data to determine whether any of the smart appliances 110 in the local network 100 are exhibiting malicious behavior. The behavior analysis engine 160 also may identify if a smart appliance 110 is vulnerable to a malicious attack, before it begins exhibiting malicious behavior. If the behavior analysis engine 160 is confident that a smart appliance 110 is exhibiting malicious behavior, then the behavior analysis engine 160 sends traffic control instructions to the network traffic hub 120 to block traffic to the smart appliance 110. In some embodiments, if a smart appliance 110 in the local network 100 requests port services the behavior analysis engine 160 may analyze the request and the smart appliance 110 to determine the smart appliance's 110 level of vulnerability to malware if port services are established. In response, the behavior analysis engine 160 may provide a recommendation to the user, via the user device 150. In some embodiments, if the level of vulnerability is above a threshold, the behavior analysis engine denies the request for port services.

The local network 100 is a local area network (LAN) that comprises the smart appliance 110, network traffic hub 120, and local network router 130. The local network 100 may be used for a number of purposes, including a home network or a network used by a business. The local network 100 is connected to the internet 140, allowing devices within the local network 100, including smart appliances 110, to communicate with devices outside of the local network 100. The local network 100 may be a private network that may require devices to present credentials to join the network, or it may be a public network allowing any device to join. In some embodiments, other devices, like personal computers, smartphones, or tablets, may join local network 100.

The internet 140 and the local network 120 may comprise any combination of LANs and wide area networks (WANs), using both wired and wireless communication systems. In some embodiments, the internet 140 and the local network 100 use standard communications technologies and protocols. For example, the internet 140 and the local network 100 may include communication links using technologies such as Ethernet, 802.11, worldwide interoperability for microwave access (WiMAX), 3G, 4G, code division multiple access (CDMA), digital subscriber line (DSL), etc. Data exchanged over the internet 140 and the local network 100 may be represented using any suitable format, such as hypertext markup language (HTML) or extensible markup language (XML). In some embodiments, all or some of the communication links of the internet 140 and the local network 100 may be encrypted using any suitable technique or techniques.

The local network router 130 is a networking device that forwards data packets (e.g., IP packets) between the local network 100 and the internet 140. When a data packet comes in on one of the networks, the router 130 reads the network address (e.g., IP address) information in the data packet to determine the ultimate destination. In some embodiments, the router may perform the DHCP functions of the local network 100. Through port forwarding or port triggering, the router 130 can forward traffic from the internet 140 directly to one or more network devices in the local network 100 (e.g., the smart appliance 110). The port services can be established manually, for example by a user of the local network 100, or automatically through UPnP. In some embodiments, the router 130 includes other network devices such as a wireless access point or network switch. For example, the router 130 can wirelessly communicate with the network devices in the local network 100 through a wireless access point.

The user device 150 is a computing device capable of receiving user input as well as transmitting and/or receiving data via the internet 140 or local network 100. In some embodiments, a user device 150 is a conventional computer system, such as a desktop or a laptop computer. Alternatively, a user device 150 may be a device having computer functionality, such as a personal digital assistant (PDA), a mobile telephone, a smartphone, or another suitable device. The user device 150 is a network device configured to communicate via the internet 140 or local network 100. In some embodiments, the user device 150 executes an application allowing a user of the user device 150 to interact with other network devices, such as the smart appliance 110, the network traffic hub 120, the router 130, or the behavior analysis engine 160. For example, the user device 150 executes a browser application to enable interaction between the user device 150 and the network traffic hub 120 via the local network 100. In some embodiments, the user device 150 interacts with other network devices (e.g., the network traffic hub 120) through an application programming interface (API) running on a native operating system of the user device 150, such as IOS® or ANDROID™. The user device 150 can communicate with the network traffic hub 120 and the behavioral analysis engine 160. For example, in response to a request for port services from the smart appliance 110, the user device 150 can receive a notification from the network traffic hub 120 and the behavioral analysis engine 160. In some embodiments, the user device 150 is operated by an owner or a network administrator of the local network 100.

Establishing Port Services without the Network Traffic Hub

Figure 2:
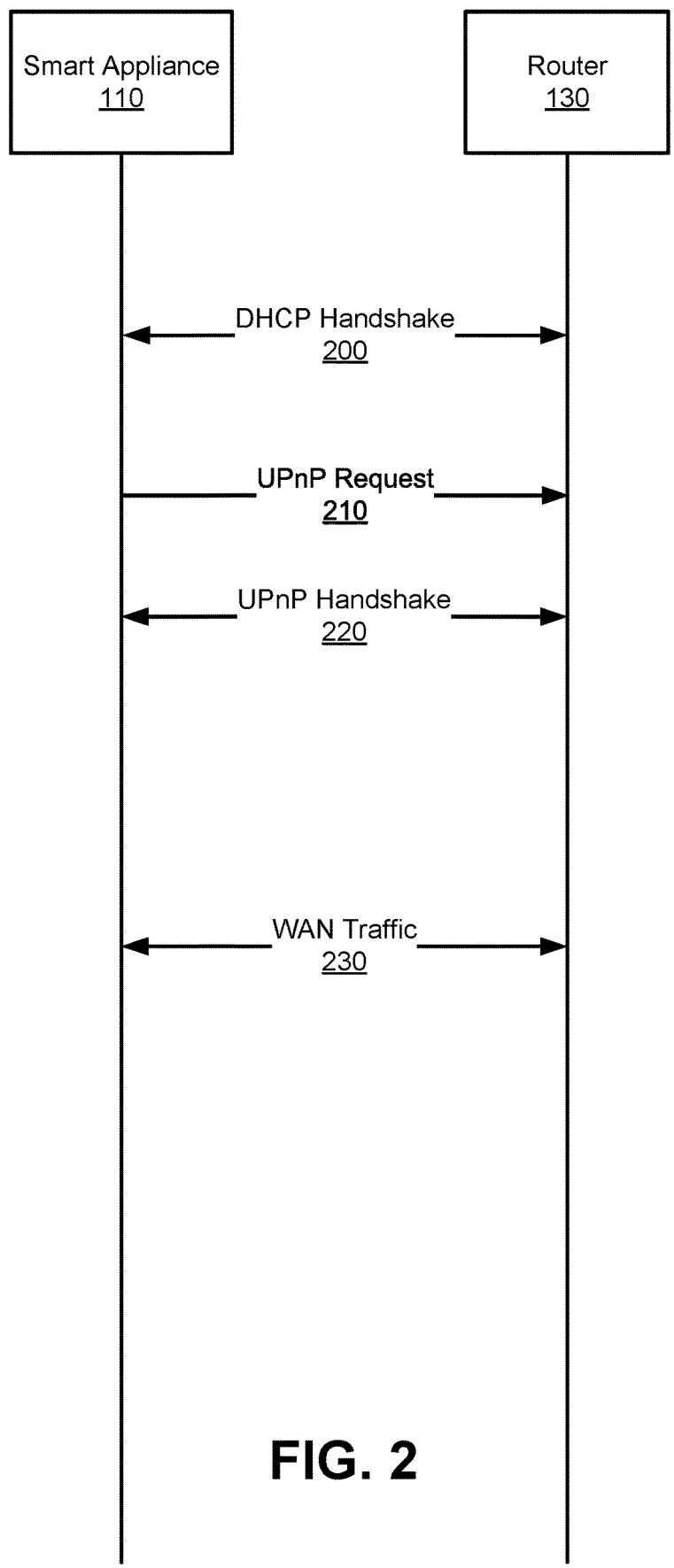
FIG. 2 illustrates a smart appliance and a router establishing a port service port, in a conventional system environment.

Referring now to FIG. 2, it illustrates a smart appliance 110 and a router 130 establishing a port service (port forwarding or port triggering) in a conventional system environment, in accordance with some embodiments. Alternative embodiments may include more, fewer, or different components and the functionality may be divided between the components differently from the description below. Additionally, alternative embodiments may include more, fewer, or different steps, and the steps may be performed in a different order from the one presented in FIG. 2.

In a conventional system environment, a smart appliance 110 communicates directly with a router 130 over a local network 100 to receive port services. The smart appliance 110 and router 130 may use DHCP, SSDP, and UPnP protocols to establish the port services.

The DHCP is a client/server network protocol that provides an IP host with its IP address and other related configuration information. The DHCP handshake 200 is the DHCP communication between the smart appliance 110 and the router 130. In the DHCP handshake 200, the router 130 acts as the DHCP server and provides the smart appliance 100 with an IP address on the local network 100. This IP address may be leased from the router 130 and may include a length of time for which the IP address can be used before a lease renewal is required. In the DHCP handshake 200, the router 130 can also provide the smart appliance 100 with other configuration information of the local network 100, such as a subnet mask and default gateway. For example, acting as the DHCP server, the router 130 can assign the smart appliance 110 to a subnet of the local network 100.

The smart appliance 110 can send a UPnP request 210 to the router 130 to receive port services. The UPnP request 210 is a request to establish port services. The UPnP request 210 can be a single message or multiple messages relating to port services. Upon receiving the UPnP request 210, the router 130 begins the UPnP handshake 220. The UPnP handshake 220 includes communication messages between the smart appliance 110 and the router 130, which automatically establish port services between the router 130 and the smart appliance 110. The UPnP request 210 and UPnP handshake 220 are parts of a networking protocol that automatically establishes a port service, such as UPnP. However the UPnP request 210 and UPnP handshake 220 are not necessarily part of the UPnP protocol. Furthermore, the UPnP request 210 and UPnP handshake 220 may be messages within other networking protocols, such as simple service discover protocol (SSDP) and/or Internet Gateway Device Protocol (IGDP). IGDP is a protocol that can enable port services, and SSDP allows network devices (such as the smart appliance 110) in a LAN (such as the local network 100) to advertise its network services and discover network services of other network devices in the local area network. Specifically SSDP can enable devices to discover routers and other UPnP enabled devices.

After a port service is established through the UPnP handshake 220, the smart appliance 110 can receive and transmit wide area network (WAN) traffic 230 from other network devices outside of the local network 100. For example, the router 130 may transmit all traffic addressed to the router 130 on port 80 to the smart appliance 110. As such, with an open port the smart appliance 100 can be directly accessed by network devices outside of the local network 100.

The method of establishing an open port through an automatic network protocol (e.g., UPnP and IGDP) as described in FIG. 2 is vulnerable to malicious activity. The protocol is often enabled by default on many routers. As a result, users of the local network 100 have no indication that the smart appliance 100 is requesting port services from the router 130. Furthermore, port forwarding or port triggering leaves the smart appliance 110 exposed on the internet 140 to unwanted scanners and malicious users. For example, even with username and password security measures enabled on the smart appliance 110, the smart appliance 110 can be vulnerable to brute force password hacking. Additionally, many smart appliances 110 have vulnerabilities at the operating system and network layers that allow remote attackers to compromise the smart appliances 100 and take over control of these devices. Thus, establishing an open port through an automatic network protocol weakens the security of conventional local networks 100.

Establishing Port Services with the Network Traffic Hub

Figure 3:
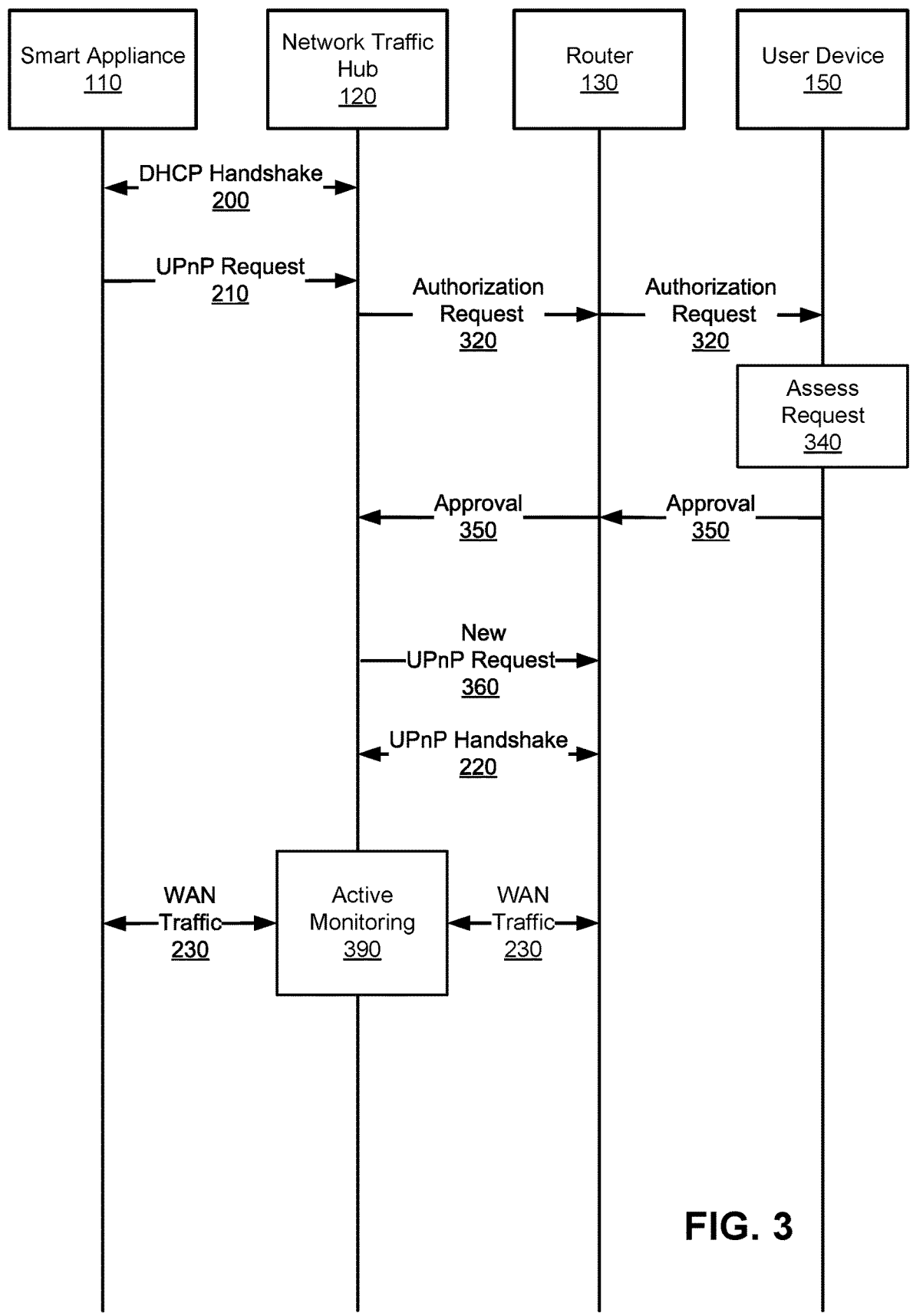
FIG. 3 illustrates a smart appliance and a router establishing a port service with a network traffic hub, in accordance with some embodiments.

FIG. 3 illustrates a smart appliance 110 and a router 130 establishing port services (port forwarding or port triggering) with a network traffic hub 120, in accordance with some embodiments. FIG. 3 illustrates an improved method for establishing port services compared to the method of FIG. 2. Alternative embodiments may include more, fewer, or different components and the functionality may be divided between the components differently from the description below. Additionally, alternative embodiments may include more, fewer, or different steps, and the steps may be performed in a different order from the one presented in FIG. 3.

In accordance with some embodiments, to establish a secure port service, the network traffic hub 120 can act as the DHCP server, instead of the router 130. As such, the network traffic hub 120 can conduct DHCP functions and can respond to DHCP requests. For example, as the DHCP server, the network traffic hub 120 can assign IP addresses and create subnets within the local network 100, among other things. To do this, the local network router 130 has its DHCP functions disabled and consequently, does not respond to DHCP requests. In some embodiments, the network traffic hub 120 disables the DHCP functions of the router 130.

To establish a secure port service, the network traffic hub 120 may isolate the smart appliance 110 and the router 130 by assigning them to different subnets on the local network 100. For example, if the router 130 resides on a first subnet with a static IP address (e.g., 10.0.0.1) the network traffic hub 120 can offer an IP address to the smart appliance 110 on a second subnet (e.g., 192.168.0.0/24) via the DHCP handshake 200. Furthermore, the network traffic hub 120 can reside on both subnets with a static IP address (e.g., 10.0.0.2). If multiple smart appliances 110 are on the local network 100, the network traffic hub 120 may isolate the smart appliances 110 by assigning all of them to the second subnet. In some embodiments, the router 130 is configured as the default gateway such that the network traffic hub 120 redirects traffic that it receives from the smart appliance 110 to the router 130 (e.g., 10.0.0.2 redirects traffic to 10.0.0.1). By assigning different subnets and forwarding traffic, the network traffic hub 120 can monitor the network traffic between the smart appliance 110 and the router 130.

After the smart appliance 110 receives its IP address (e.g., 192.168.0.0/24) on the second subnet, the smart appliance 110 can transmit an UPnP request 210. Due to the structure of the subnets and the defined default gateway provided by the DHCP handshake, the network traffic hub 120 receives the UPnP request 210 and holds it (e.g., it does not forward it to the router 130). Upon receiving the UPnP request 210, the network traffic hub 120 can send an authorization request 320 to the user device 150 to request authorization from a user to allow the smart appliance 110 to connect to the internet 140 through a port service.

In some embodiments, the authorization request 320 is sent to the behavioral analysis engine 160 before the authorization request 320 is sent to the user device 150. For example, the behavior analysis engine 160 may analyze the request, the router 130, and the smart appliance 110 to determine a security threat level (e.g., the smart appliance's 110 level of vulnerability to malicious software) if the port service is authorized by the user.

After analysis, the authorization request 320 (or a modified authorization request 320) can be sent to the user device 150. In these embodiments, the authorization request 320 can include recommendations and analysis from the behavior analysis engine 160. If the security threat level is above a threshold, the behavior analysis engine 160 can automatically deny the authorization request 320. A user can receive the authorization request 320 on the user device 150 in the form of a SMS text, email, application notification, or other forms of synchronous or asynchronous electronic communication.

In embodiments related to port triggering, the authorization request 320 sent to the user device 150 may include a specified time period during which the network traffic hub 120 forwards network traffic to the smart appliance 110 (e.g., one hour, twenty-four hours, forty-eight hours, one week). After the time period expires, the network traffic 120 hub may be instructed to terminate the port service.

Upon receiving the authorization request 320 on the user device 150, the user can assess 340 the request and determine if the smart appliance 110 should be allowed to receive port services. After the user makes a decision, the user device 150 can transmit a response to the network traffic hub 120 (e.g., through the behavioral analysis engine 160) indicating whether the user approves or denies the authorization request 320. If the user approves the authorization request 320, the user device 150 sends an approval 350 to the network traffic hub 120 (e.g., through the behavioral analysis engine 160). If the user denies the authorization request 320, the user device 150 can send a denial to the network traffic hub 120 (not shown in FIG. 3) (e.g., through the behavioral analysis engine 160).

If the network traffic hub 120 receives an approval 350, the network traffic hub 120 broadcasts a new UPnP request 360 to the router 130. The new UPnP request 360 is a request for port services between the network traffic hub 120 and the router 130. The new UPnP request 360 may be a modified version of the UPnP request 210 submitted by the smart appliance 110. The new UPnP message 360 may request that the router 130 forward all traffic from the internet 140 addressed to the router's 130 public IP address at a specific available port to the network traffic hub 120. For example, the router 130 may be requested to forward WAN traffic 230 addressed to the router 130 on port 80 to the network traffic hub 120 on port 8081. This may be done on a subnet only including the router 130 and the network traffic hub 120. Upon receiving the new UPnP request 360, the requested port service described in the new UPnP request 360 can be established between the network traffic hub 120 and the router 130 through the UPnP handshake 220.

After a port service is established between the router 130 and the network traffic hub 120, the network traffic hub 120 can received WAN traffic 230 intended for the smart appliance 110 through port forwarding or port triggering. The network traffic hub 120 can forward the WAN traffic 280 to the smart appliance 110 through traffic forwarding by generating an internal firewall rule, such as a Linux IPTables/NetFilter rule. For example, WAN traffic 230 addressed to the router 130 on port 80 is transmitted to the network traffic hub 120 on port 8081. In response, the network traffic hub 120 forwards (through the internal firewall rule) the received WAN traffic 230 on port 8081 to the smart appliance 110 on port 80, for example. This can also work in reverse such that the smart appliance can send network traffic to a device outside of the local network 100.

The network traffic hub 120 can monitor 390 the WAN traffic 230 that it is forwarding between the router 130 and the smart appliance 110, for example, for malicious behavior. Through monitoring, if the network traffic hub 120 detects malicious activity, the network traffic hub 120 can stop forwarding traffic to and from the smart appliance 110 and terminate the established port service. If potentially malicious activity is detected, the network traffic hub 120 may send a notification to the behavior analysis engine 160 and/or the user device 150 (e.g., another authorization request 320). In response, the behavior analysis engine 160 and/or the user device 150 can request that the port service continue to be maintained or be terminated. Alternatively, in the case where the network traffic hub 120 proactively made the decision to terminate port services, if the user has re-confirmed, the behavior analysis engine 160 and/or user device 150 may request that the port service be re-established.

Figure 4:
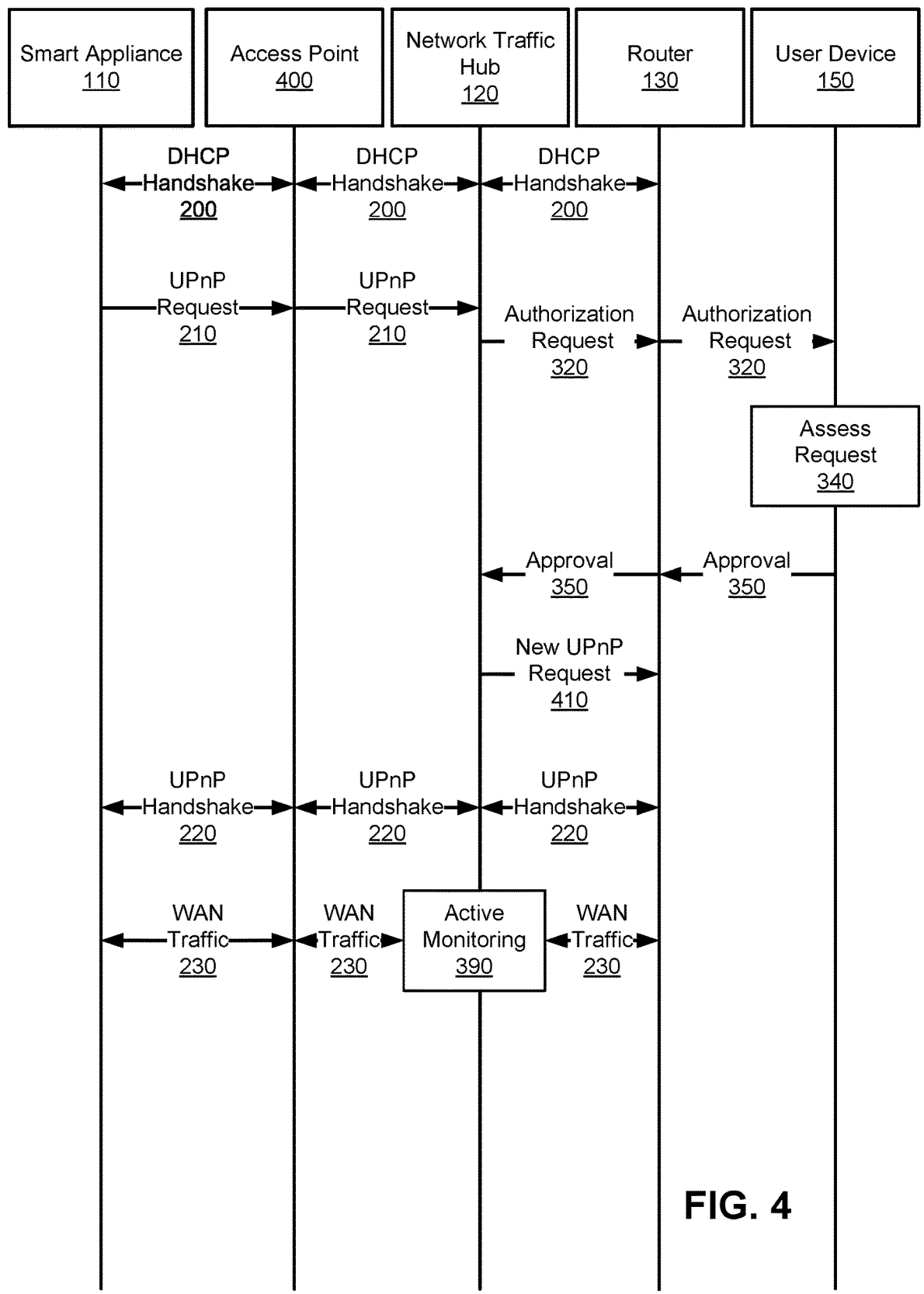
FIG. 4 illustrates a smart appliance and router establishing a port service port with a network traffic hub in bridge mode, in accordance with some embodiments.

FIG. 4 illustrates a smart appliance 110 and router 130 establishing a port service (port forwarding or port triggering) with a network traffic hub 120 in bridge mode, in accordance with some embodiments. Alternative embodiments may include more, fewer, or different components and the functionality may be divided between the components differently from the description below. Additionally, alternative embodiments may include more, fewer, or different steps, and the steps may be performed in a different order from the one presented in FIG. 4.

Figure 5:
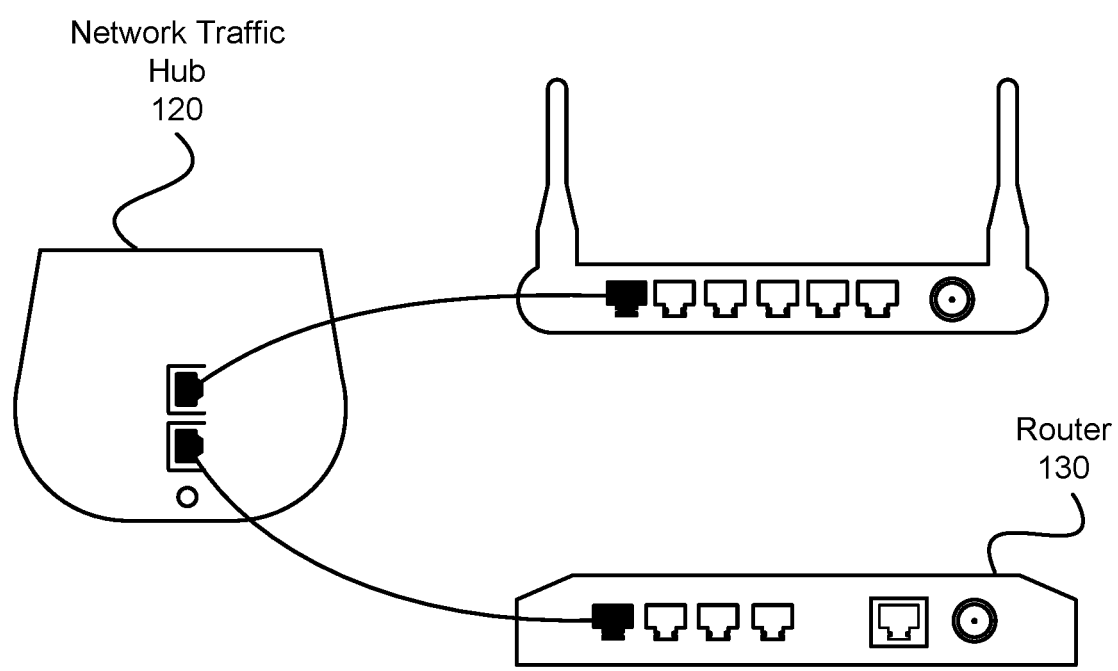
FIG. 5 illustrates a router and a network traffic hub in bridge mode, in accordance with some embodiments.

Turning briefly to FIG. 5, it illustrates an example of a router 130 and a network traffic hub 120 in bridge mode, in accordance with some embodiments. In bridge mode, the network traffic hub 120 may be connected between the router 130 and an access point 400. The access point 400 may be an additional network device, such as a wireless access point or network switch which transmits and receives network traffic to and from the router 130. By being connected between the router 130 and the access point 400, the network traffic hub 120 can process and monitor the network traffic transmitted between the access point 400 and the router 130.

Referring back to FIG. 4, in the bridge mode configuration, the router 130 may provide DHCP services (through the DHCP handshake 200) rather than the network traffic hub 120, and the smart appliance 110 can exist on the same subnet as the router 130. The smart appliance can request port services by sending the UPnP request 210 to the router 130 through the access point 400. However, the network traffic hub 120 can intercept and block the UPnP request 210 destined to the local network router 130 and hold or drop the UPnP request 210 until approval 350 is received from the user device 150. The network traffic hub 120 may intercept the UPnP request 210 to the router 130 using standard firewall subsystems, such as iptables or ebtables on Linux distributions. As described with reference to FIG. 3, the network traffic hub 120 can send an authorization request 320 and wait until the request is assessed 340 and an approval 350 (or denial) is received from the user device 150.

If approval 350 is granted for the smart appliance 110 to expose an external port on the router 130, the network traffic hub 120 can send a new UPnP request 410 to the router 130. The new UPnP request 410 is a request for port services between the smart appliance 110 and the router 130. The new UPnP request 410 can be the UPnP request 210, a copy of the UPnP request 210, or a modified version of the UPnP request 120.

After the new UPnP request 410 is received by the router 130, the router 130 and the smart appliance 110 can establish a port service through the UPnP handshake 220. After a port service is established through the UPnP handshake 220, the smart appliance 110 can receive and transmit WAN traffic 230 through the open port established on the router 130. Through bridge mode the network traffic hub 120 can monitor 390 the WAN traffic 230.

Establishing Port Services without Automatic Protocols

Figure 6A:
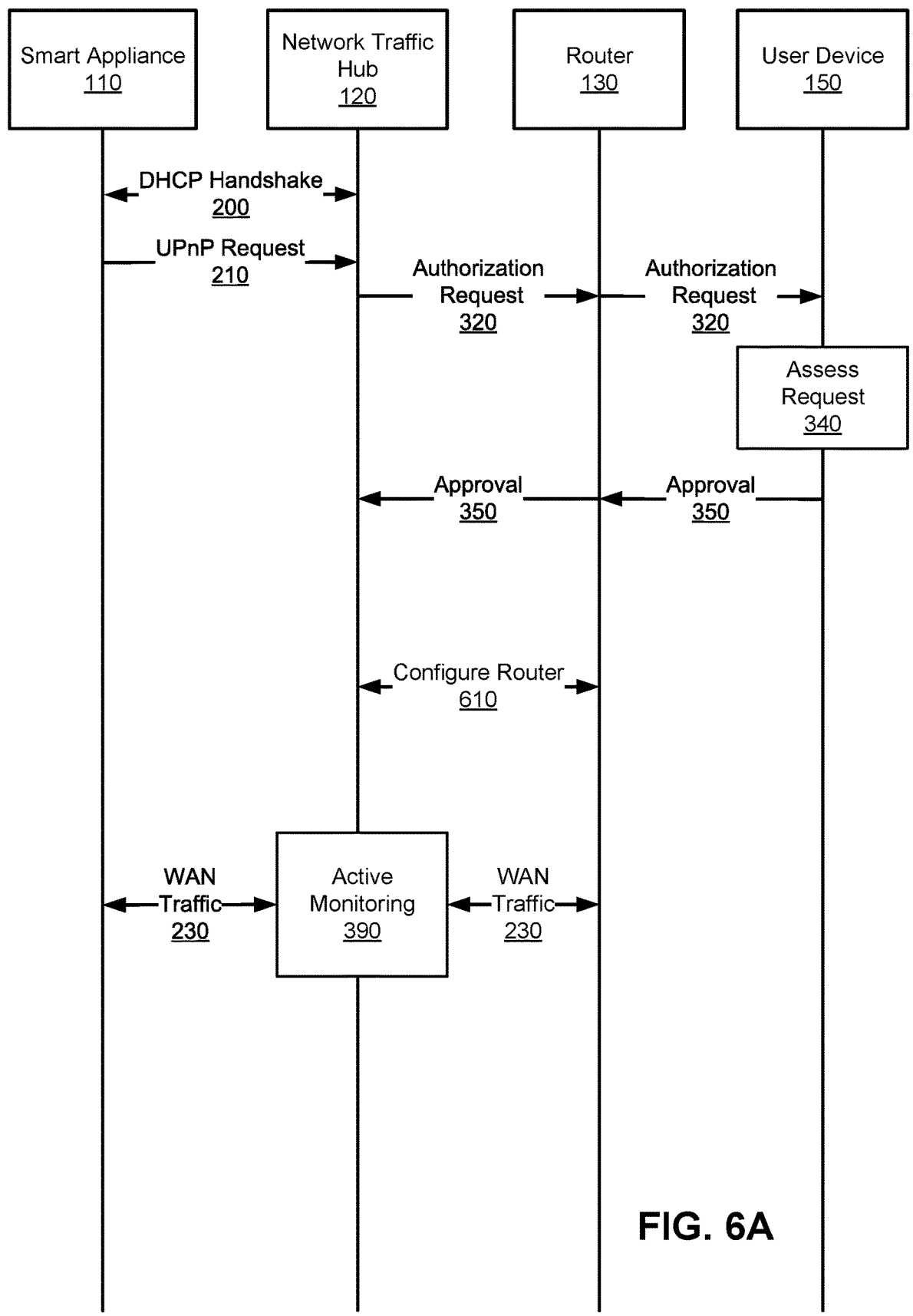
FIG. 6A illustrates a smart appliance and a network traffic hub establishing a port service, in accordance with some embodiments.
Figure 6B:
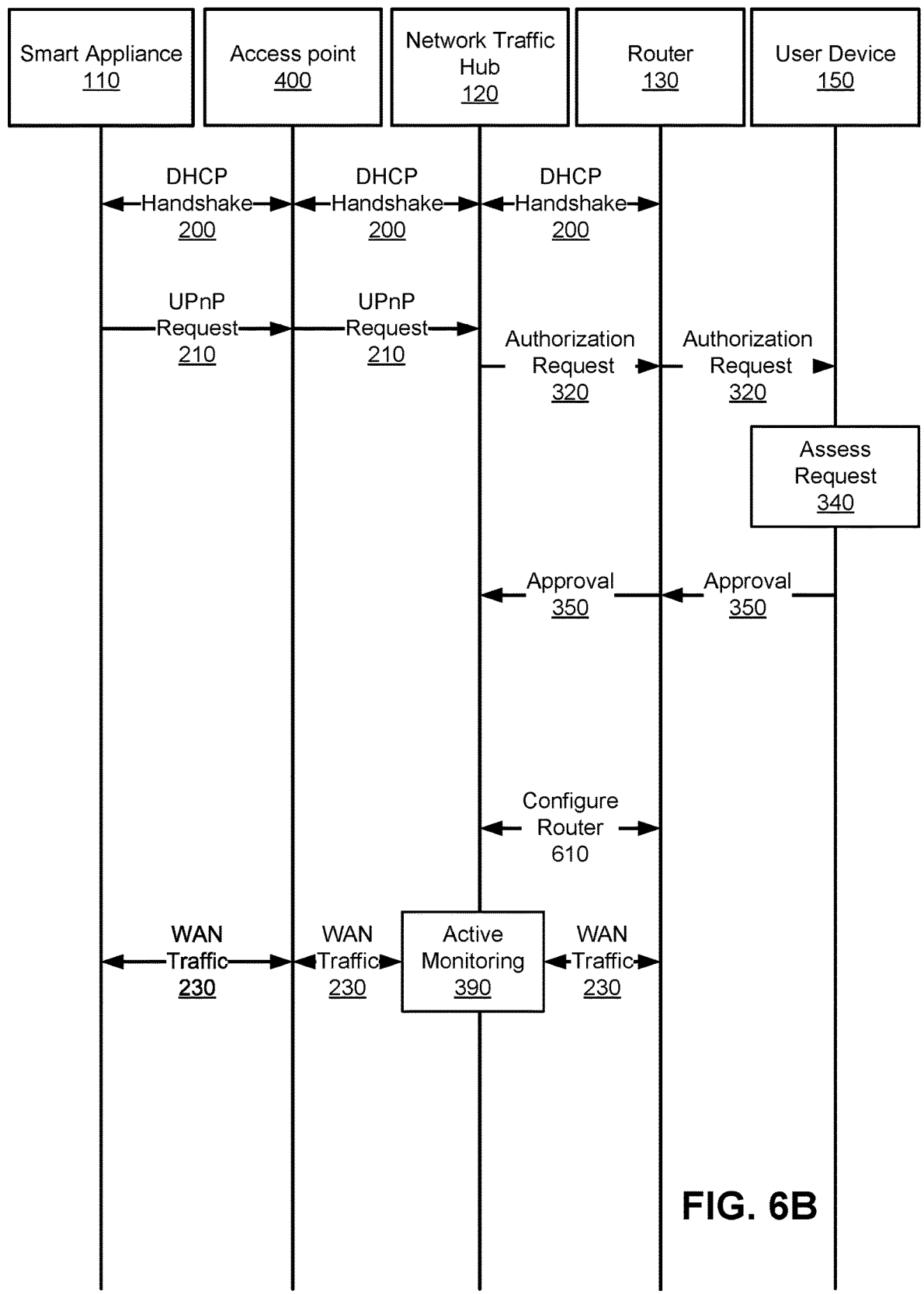
FIG. 6B illustrates a smart appliance and a network traffic hub establishing a port service in bridge mode, in accordance with some embodiments.

Referring now to FIGS. 6A and 6B, illustrated are methods for establishing port services when protocols for automatic establishment of port services is not available through the router 130. FIG. 6A it illustrates a smart appliance 110 and a network traffic hub 120 establishing a port service, in accordance with some example embodiments. FIG. 6B illustrates a smart appliance 110 and a network traffic hub 120 establishing a port service in bridge mode, in accordance with some example embodiments. It is noted that alternative embodiments may include more, fewer, or different components and the functionality may be divided between the components differently from the description below. Additionally, alternative embodiments may include more, fewer, or different steps, and the steps may be performed in a different order from the ones presented in FIGS. 6A and 6B.

In some embodiments, the router 130 may not support protocols for automatic establishment of port services or the protocols for automatic establishment of port services may be disabled on the router 130 for security reasons. For example, the UPnP protocol may be disabled or not supported on some routers 130. The network traffic hub 120 can determine this by probing the router 130 for its ability to execute UPnP requests or by utilizing SSDP to discover the router's 130 capabilities explicitly. Thus, the network traffic hub 120 can perform the functionality of establishing and maintaining port services, effectively enabling the automatic establishment of port services (e.g., through UPnP) for networks that do not allow for it natively, but with the added security and authorization previously described with reference to FIGS. 3-5. In these embodiments, the network traffic hub 120 accepts the UPnP request 210 from the smart appliance 110 and sends an authorization request 320 to the user as described with reference to FIG. 3 and FIG. 4. Among other advantages, this allows the smart appliance 110 to use protocols for automatic establishment of port services, such as UPnP, SSDP, and IGDP, to establish a port service, even though the network does not normally allow for it.

If the network traffic hub 120 receives an approval 350, the network traffic hub 120 can configure 610 the router 310 to open a port for the requested port service (e.g., port forwarding). The network traffic hub 120 can do this by interacting with the user interface (UI) of the router 130. For example, the network traffic hub 120 transmits one or more HTTP or HTTPS requests to the listening web server natively deployed on the router 130 for the purpose of allowing end user administrator. This allows the network traffic hub 120 to receive HTML/JavaScript documents representing an administrative UI from the router 130. The network traffic hub 120 can authenticate itself with the router 130 using default credentials or user provided credentials (e.g., provided in the approval 350 or in other configuration steps). The network traffic hub 120 can navigate the UI of the router 130 to add port forwarding or port triggering entries on the router 130. To authenticate itself and navigate the UI of the router 130, the network traffic hub may execute scripts that emulate human browsing behavior. This can be referred to as "screen scraping."

To perform screen scraping, the network traffic hub 120 may receive information about the router 130 (e.g., make and model) and execute a specific script written for the UI of that particular router 130. The network traffic hub 120 may have direct access to a database of scripts or the network traffic hub 120 may receive the necessary script from the behavior analysis engine 160.

Figure 7:
FIG. 7 is an example user interface webpage for a router, in accordance with some embodiments.

FIG. 7 is an example UI 700 webpage for a router 130, in accordance some embodiments. By executing one or more scripts, the network traffic hub 120 can navigate the UI 700 to enable port services between the router 130 and a smart appliance 110 or the network traffic hub 120 depending on the mode of the network traffic hub.

After the network traffic hub 120 configures 610 the router 130, an open port for port forwarding or port triggering is established, and the network traffic hub 120 can monitor 390 WAN traffic 230 between the router 130 and the smart appliance 110. Similar to FIG. 3, in FIG. 6A the WAN traffic 230 is sent directly to the network traffic hub 120. Upon receiving and monitoring 390 the traffic 230, the network traffic hub 120 can forward the traffic to the smart appliance 110 or the router 130. Similar to FIG. 4, in FIG. 6B the network traffic hub 120 monitors 390 the WAN traffic 230 the WAN traffic 230 sent directly between the smart appliance 110 and the router 130.

Example Process for Establishing a Port Service

Figure 8:
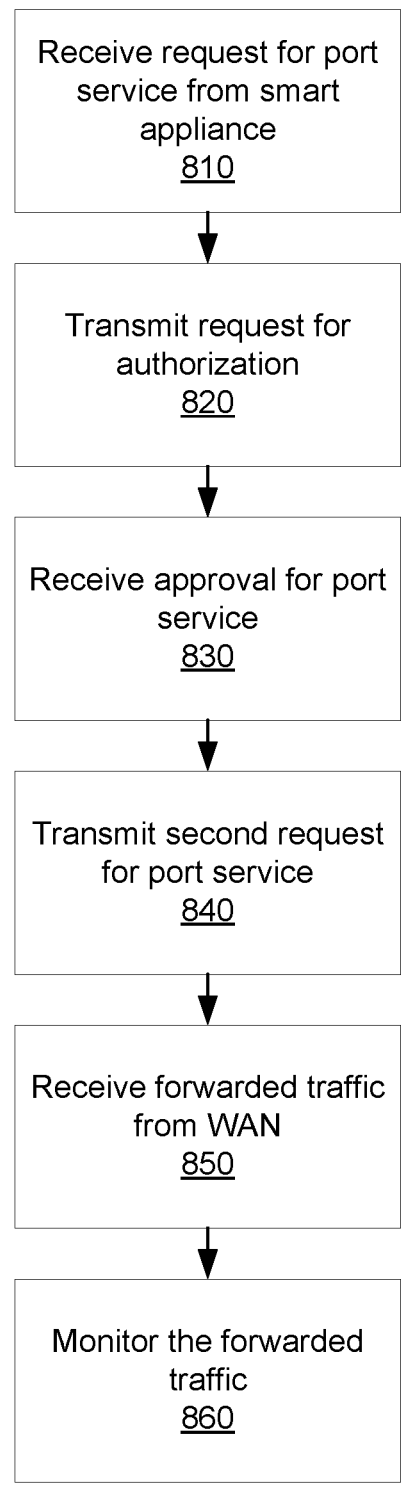
FIG. 8 is a flow diagram that illustrates methods for establishing a port service with a network traffic hub, in accordance with some embodiments.

FIG. 8 is a flow diagram that illustrates methods for establishing a port service (port forwarding or port triggering) with a network traffic hub, in accordance with some embodiments. A network traffic hub receives 810 a request to establish a port service from a smart appliance in a local network. The request can be a part of a networking protocol that automatically (e.g., without human direction) establishes a port service, such as UPnP, SSDP, and IGDP. In some embodiments, the request is sent to the network traffic hub directly, and in other embodiments, the network traffic hub intercepts the request being sent to a router in the local network (e.g., this can occur in bridge mode). Instead of allowing the smart appliance to automatically establish a port service with the router or the network traffic hub, the network traffic hub may hold or drop the request until approval is received. Among other advantages, this can inform a user (e.g., an administrator of the local network) that a smart appliance is requesting a port service. Additionally, this can allow the user to approve or deny the establishment of the port service.

The network traffic hub transmits 820 an authorization request to an authorization device, such as a behavior analysis engine or a user device. The behavior analysis engine can be outside of the local network and can analyze the authorization request and network traffic from the smart appliance and the router (e.g., intercepted or received by the network traffic hub) to determine a level of vulnerability of the smart appliance to a malicious attack. If the vulnerability of the smart appliance is above a threshold, the behavior analysis engine may deny the authorization request. Otherwise, the behavior analysis engine can send the authorization request along with a response recommendation to the user via a user device. If the user denies the authorization request, then the network traffic hub will not allow the smart appliance to establish a port service. If a port service is already established, then the network traffic hub can terminate the port service (e.g., by dropping network traffic occurring from the port service and instructing the router to close the port).

If the user approves the authorization request, an approval message is received 830 by the network traffic hub (e.g, through the behavioral analysis engine). In some embodiments, the approval message approves the port service for a period of time, such as 24 hours, after which, the port service is terminated. After receiving 830 the approval message, the network traffic hub can transmit 840 a second request to establish a port service with the router. This message may be a copy or modified copy of the first request to establish a port service. In some embodiments, this request (or subsequent handshake messages) instructs the router to open a port that forwards WAN network traffic (e.g., from the internet) to the network traffic hub. In other embodiments, such as in bridge mode, the network traffic hub instructs the router to open a port that forwards WAN network traffic to the smart appliance. Upon receiving the request, the router and the smart appliance or the network traffic hub can establish a port service.

Once the port service is established, the network traffic hub can receive 850 forwarded traffic sent from one or more devices outside of the local network. The network traffic hub can also receive traffic from the smart appliance directed to one or more devices outside the local network. If this traffic if it is not directed to the network traffic hub, the network traffic hub can receive 850 it by intercepting it.

The network traffic hub monitors 860 the received traffic. For example, the network traffic hub monitors for malicious activity that can harm the smart appliance or other devices in the local network. If malicious activity is detected, the network traffic hub can terminate the established port service and send a notification to the local network administrator. After monitoring 860 the received traffic, the network traffic hub can forward or transmit the received traffic to its intended destination (the smart appliance or a device outside the local network).

At any time, the network traffic hub can receive instructions to terminate the established port service. For example, after initially approving the authorization request, a user may later decide to deny the authorization request. As such the network traffic hub can terminate the port service after receiving the denial request from a user device.

Architecture of Devices

Figure 9:
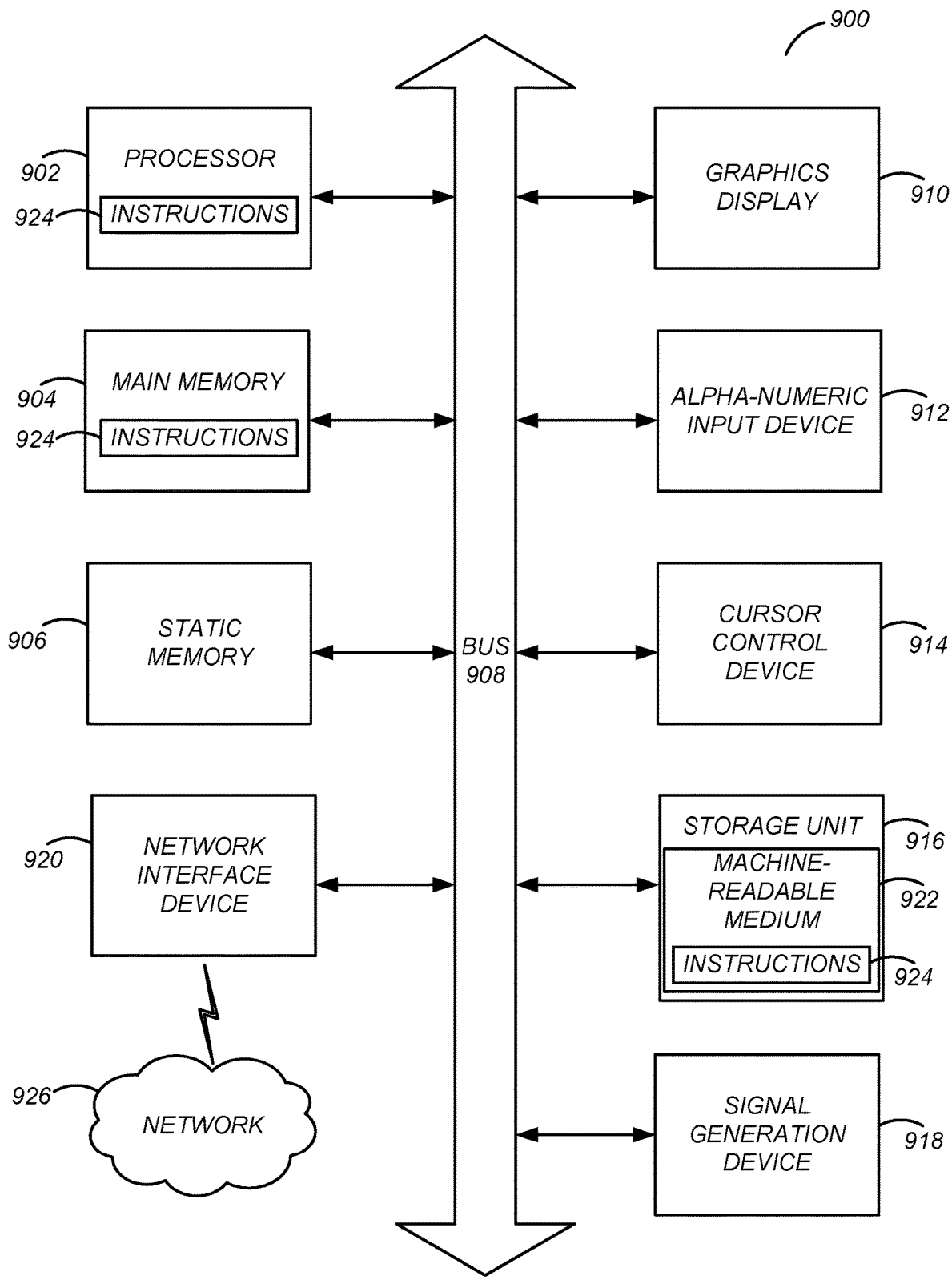
FIG. 9 is a block diagram illustrating components of an example machine able to read instructions from a machine-readable medium and execute them in a processor (or controller).

FIG. 9 is a block diagram illustrating components of an example machine able to read instructions from a machine-readable medium and execute them in a processor (or controller). Specifically, FIG. 9 shows a diagrammatic representation of a machine in the example form of a computer system 900. The computer system 900 can be used to execute instructions 924 (e.g., which forms program code or software) for causing the machine to perform any one or more of the methodologies (or processes) described herein. In alternative embodiments, the machine operates as a standalone device or a connected (e.g., network) device that connects to other machines. In a network deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, a network traffic hub, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 900 also includes a main memory 904. The computer system may include a storage unit 916. The processor 902, memory 904, and the storage unit 916 communicate via a bus 908.

In addition, the computer system 900 can include a static memory 906, a display driver 910 (e.g., to drive a plasma display panel (PDP), a liquid crystal display (LCD), or a projector). The computer system 900 may also include alphanumeric input device 912 (e.g., a keyboard), a cursor control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 926 via the network interface device 920. The network interface device 920 may include a wired or wireless network interface controller that can communicate with other network devices via wired and/or wireless technologies. This may include Ethernet, 802.11, worldwide interoperability for microwave access (WiMAX), 3G, 4G, code division multiple access (CDMA), digital subscriber line (DSL), etc.

While machine-readable medium 922 is shown in an embodiment to be a single medium, the term "machine-readable medium" should be taken to include a single medium or multiple media (e.g., a centralized or distributed database, or associated caches and servers) able to store the instructions 924. The term "machine-readable medium" shall also be taken to include any medium that is capable of storing instructions 924 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The disclosed computing configurations provide numerous benefits and advantages. For example, benefits and advantages may include improving the security of conventional port service protocols by intercepting a request for the port service sent from one network device to the other. The request and one or both of the network devices may be analyzed for security vulnerabilities that would result from the port service being established between the network devices. By receiving or intercepting the request for a port service, the automatic establishment of the port service between the network devices is prevented until an approval or denial of the port service is received from a user. As such, the user is informed of the request for a port service and has the ability to approve or deny the port service request. Additionally, the network traffic hub may support conventional port service protocols if they are unsupported by the router.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-9. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 902, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 904). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for managing establishment of a port service automatically (e.g., halting it) until user authorization is received through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation, and details of the method and apparatus disclosed herein without departing from the spirit and scope defined in the appended claims.

What is claimed is:

1. A method, comprising:
    intercepting, by a network traffic hub, a request for port services from a smart appliance, the smart appliance and a router being on a same local area network, the request for port services comprising one of a request for port forwarding services or a request for port triggering services and being transmitted by the smart appliance toward the router;
    inhibiting, by the network traffic hub, the request for port services from being sent to the router;
    transmitting, by the network traffic hub, a request for authorization to an authorization device;
    receiving, by the network traffic hub, an authorization message from the authorization device approving the request for port services from the smart appliance;
    transmitting, by the network traffic hub, a second request for port services to the router, the second request for port services including instructions for the router to forward network traffic from a wide area network to the network traffic hub;
    receiving, from the router by the network traffic hub, forwarded network traffic from the wide area network; and
    monitoring, by the network traffic hub, the forwarded network traffic from the router to the smart appliance to identify malicious activity.

2. The method of claim 1, wherein the request for port services is a part of the universal plug and play (UPnP) networking protocols set.

3. The method of claim 1, further comprising:
    creating a first subnetwork and a second subnetwork in the local area network, the first subnetwork including the smart appliance and the network traffic hub, and the second subnetwork including the router and the network traffic hub.

4. The method of claim 1, wherein the network traffic hub receives the forwarded network traffic from the wide area network by intercepting the forwarded network traffic.

5. The method of claim 1, further comprising:
    receiving, from the router by the network traffic hub, a message from the authorization device removing approval of port services to the smart appliance; and
    transmitting, by the network traffic hub, instructions to the router to cease forwarding traffic from the wide area network.

6. The method of claim 1, wherein the received authorization message approves the port services request from the smart appliance for a time period, further comprising:
    after the time period has expired, transmitting, by the network traffic hub, instructions to the router to cease forwarding traffic from the wide area network.

7. The method of claim 1, wherein the router has dynamic host configuration protocol (DHCP) functions disabled, further comprising: assigning, by the network traffic hub through DHCP, an IP address to the smart appliance.

8. The method of claim 1 wherein the request for port services identifies a port number such that the router is to forward to the smart appliance all packets received from the wide area network that identify the port number as a destination port number.

9. A network traffic hub comprising:
a network interface communicatively coupled to a smart appliance via a first communication channel in a local area network and communicatively coupled to a router via a second communication channel, the router being in the same local area network;
a processor; and
a memory storing program code, the program code when executed causes the processor to:
intercept, via the first communication channel, a request for port services from the smart appliance, the request for port services comprising one of a request for port forwarding services or a request for port triggering services and being transmitted by the smart appliance toward the router;
inhibit, by the network traffic hub, the request for pot services from being sent to the router;
transmit, via the second communication channel, a request for authorization to an authorization device;
receive, via the second communication channel, an authorization message from the authorization device approving the request for port services from the smart appliance;
transmit, via the second communication channel, a second request for port services to the router, the second request for pot services including instructions for the router to forward network traffic from a wide area network to the network traffic hub;
receive, from the router via the second communication channel, forwarded network traffic from the wide area network; and
monitor the forwarded network traffic from the router to the smart appliance to identify malicious activity.

10. The network traffic hub of claim 9, wherein the communication channels are established by creating two subnetworks, further comprising program code configures to cause the processor to:
create, two subnetworks in the local area network, the first subnetwork including the smart appliance and the network traffic hub, and the second subnetwork including the router and the network traffic hub.

11. The network traffic hub of claim 9, further comprising program code configured to cause the processor to:
receive, via the second communication channel, a message from the authorization device removing approval of the port services to the smart appliance; and
transmit, via the second communication channel, instructions to the router to cease forwarding traffic from the wide area network.

12. The network traffic hub of claim 9, wherein the received authorization message approves the port services request from the smart appliance for a time period, further comprising program code configured to cause the processor to:
after the time period has expired, transmit, via the second communication channel, instructions to the router to cease forwarding traffic from the wide area network.

13. The network traffic hub of claim 9, wherein the router has dynamic host configuration protocol (DHCP) functions disabled, further comprising program code configured to cause the processor to:
assign, through DHCP, an IP address to the smart appliance.

14. A method, comprising:
receiving, by a network traffic hub from a smart appliance, a first port services request that is directed to a router, the smart appliance and the router being on a same local area network (LAN), the first port services request identifying a port number such that the router is to forward to the smart appliance all packets received from an external computing device that identify the port number as a destination port number, the external computing device being on a second network that is different from the LAN;
inhibiting, by the network traffic hub, the first port services request from being sent to the router;
transmitting, by the network traffic hub, a request for authorization of the first port services request to an authorization device;
receiving, by the network traffic hub, an authorization message from the authorization device approving the first port services request from the smart appliance;
transmitting, by the network traffic hub, a second port services request to the router, the second port services request including instructions for the router to forward network traffic from the external computing device to the network traffic hub;
receiving, from the router by the network traffic hub, forwarded network traffic from the external computing device; and
monitoring, by the network traffic hub, the forwarded network traffic from the router to the smart appliance to identify malicious activity.

* * * * *

UNITED STATES PATENT AND TRADEMARK OFFICE
CERTIFICATE OF CORRECTION

PATENT NO. : 10,819,723 B2  
APPLICATION NO. : 15/936317  
DATED : October 27, 2020  
INVENTOR(S) : Leonid Kuperman et al.

Page 1 of 1

It is certified that error appears in the above-identified patent and that said Letters Patent is hereby corrected as shown below:

In the Claims

On Column 18, Line 57, replace:
"port services request" with --"request for port services"--.

On Column 19, Lines 19-20, replace:
"request for pot services" with --"request for port services"--.

On Column 19, Line 29, replace:
"second request for pot services" with --"second request for port services"--.

On Column 19, Lines 39-40, replace:
"further comprising program code configures to cause the processor to" with --"further comprising program code configured to cause the processor to"--.

On Column 20, Lines 5-6, replace:
"approves the port services request" with --"approves the request for port services"--.

On Column 20, Line 11, replace:
"cease forwarding traffic" with --"cease forwarding network traffic"--.

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*